(12) United States Patent
Dvorkis et al.

(10) Patent No.: US 7,367,682 B2
(45) Date of Patent: *May 6, 2008

(54) COLOR IMAGE PROJECTION ARRANGEMENT AND METHOD

(75) Inventors: Paul Dvorkis, East Setauket, NY (US); Ron Goldman, Cold Spring Harbor, NY (US); Chinh Tan, Setauket, NY (US); Dmitriy Yavid, Stony Brook, NY (US); Miklos Stern, Flushing, NY (US); Carl Wittenberg, Water Mill, NY (US); Frederick F. Wood, Medford, NY (US); Askold Strat, Sound Beach, NY (US); Michael Slutsky, Stony Brook, NY (US); Narayan Nambudiri, Park, NY (US); Richard Rizza, North Bellmore, NY (US); Thomas Mazz, Huntington Station, NY (US); Lisa Fan, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 276 days.

This patent is subject to a terminal disclaimer.

(21) Appl. No.: 11/043,458

(22) Filed: Jan. 26, 2005

(65) Prior Publication Data

US 2006/0119804 A1    Jun. 8, 2006

Related U.S. Application Data

(60) Provisional application No. 60/633,951, filed on Dec. 7, 2004.

(51) Int. Cl.
*G03B 3/00* (2006.01)
*G03B 21/26* (2006.01)
*G03B 21/28* (2006.01)
*G03H 1/02* (2006.01)
*G02B 13/18* (2006.01)
*G02B 26/08* (2006.01)
*G02B 27/20* (2006.01)
*H04N 3/08* (2006.01)
*H01S 3/00* (2006.01)
*H01S 5/00* (2006.01)

(52) U.S. Cl. .................. 353/101; 353/100; 353/31; 353/37; 353/84; 353/94; 359/27; 359/202; 359/719; 348/205; 362/553; 362/259; 372/50.121; 372/50.23

(58) Field of Classification Search ............. 353/31, 353/37, 84, 94, 98, 99, 102, 100, 101; 359/27, 359/201, 202, 204, 212, 214, 216, 217, 331, 359/456, 460, 719, 728; 348/203, 739, 744, 348/750, 756, 760, 67, 205; 345/31, 88, 345/108; 250/559.13; 362/553, 259; 372/1–3, 372/5–8, 38.02, 50.12, 71, 50.121, 20.23

See application file for complete search history.

(56) References Cited

U.S. PATENT DOCUMENTS 6,483,556 B1 * 11/2002 Karakawa et al. .......... 348/750

(Continued)

*Primary Examiner*—Rochelle Blackman
(74) *Attorney, Agent, or Firm*—Kirschstein, et al.

(57) ABSTRACT

A lightweight, compact image projection module, especially for mounting in a housing having a light-transmissive window, is operative for causing selected pixels in a raster pattern to be illuminated to produce an image of high resolution of VGA quality in color.

19 Claims, 6 Drawing Sheets

U.S. PATENT DOCUMENTS

| | | |
|---|---|---|
| 6,676,267 B2 * | 1/2004 | Takase ........................ 359/872 |
| 6,873,460 B1 * | 3/2005 | Burstyn et al. ............. 359/461 |
| 6,945,652 B2 * | 9/2005 | Sakata et al. ................. 353/30 |
| 2002/0075916 A1 * | 6/2002 | Sato et al. ..................... 372/36 |
| 2006/0279664 A1 * | 12/2006 | Tan et al. ................... 348/789 |

* cited by examiner

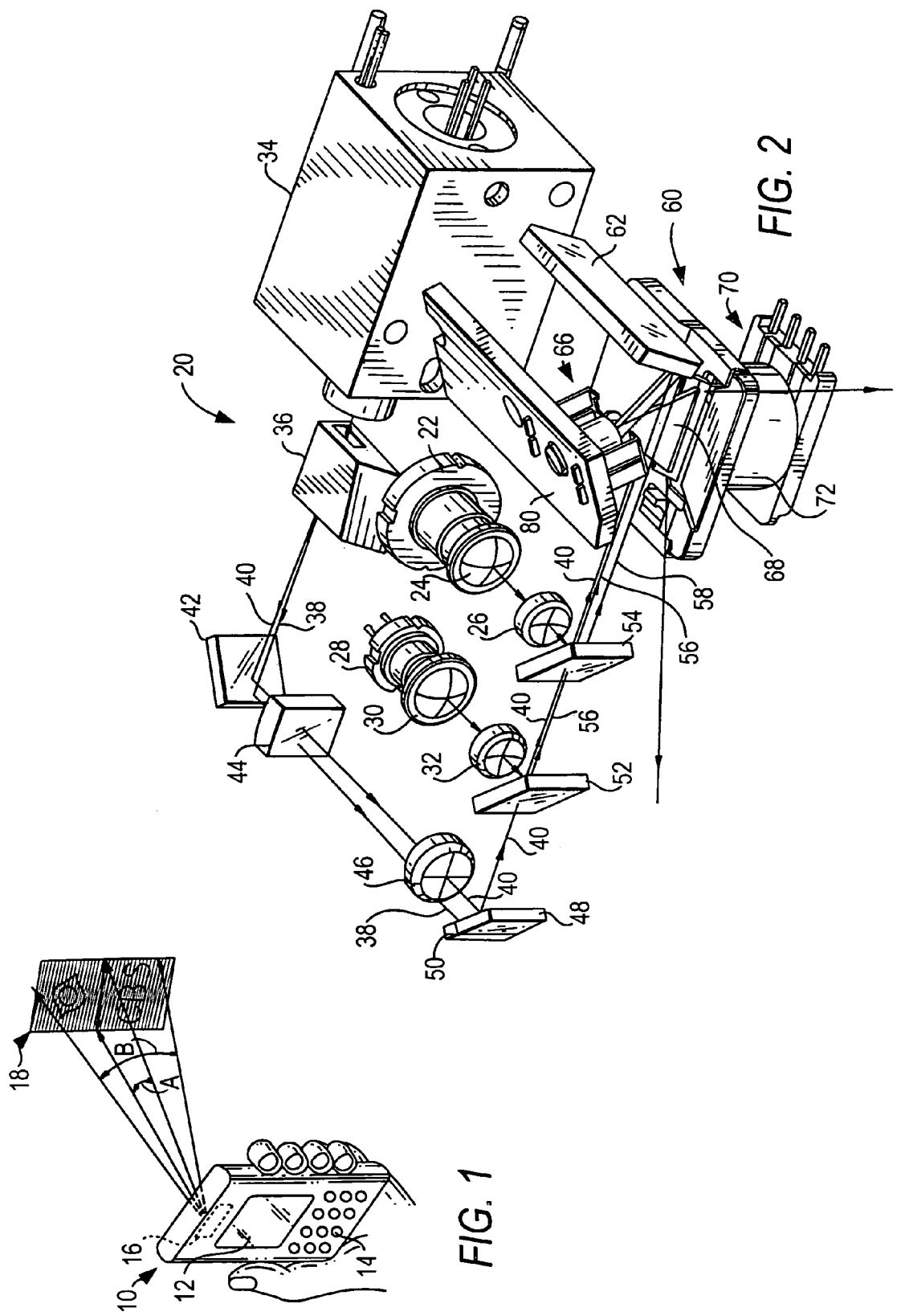

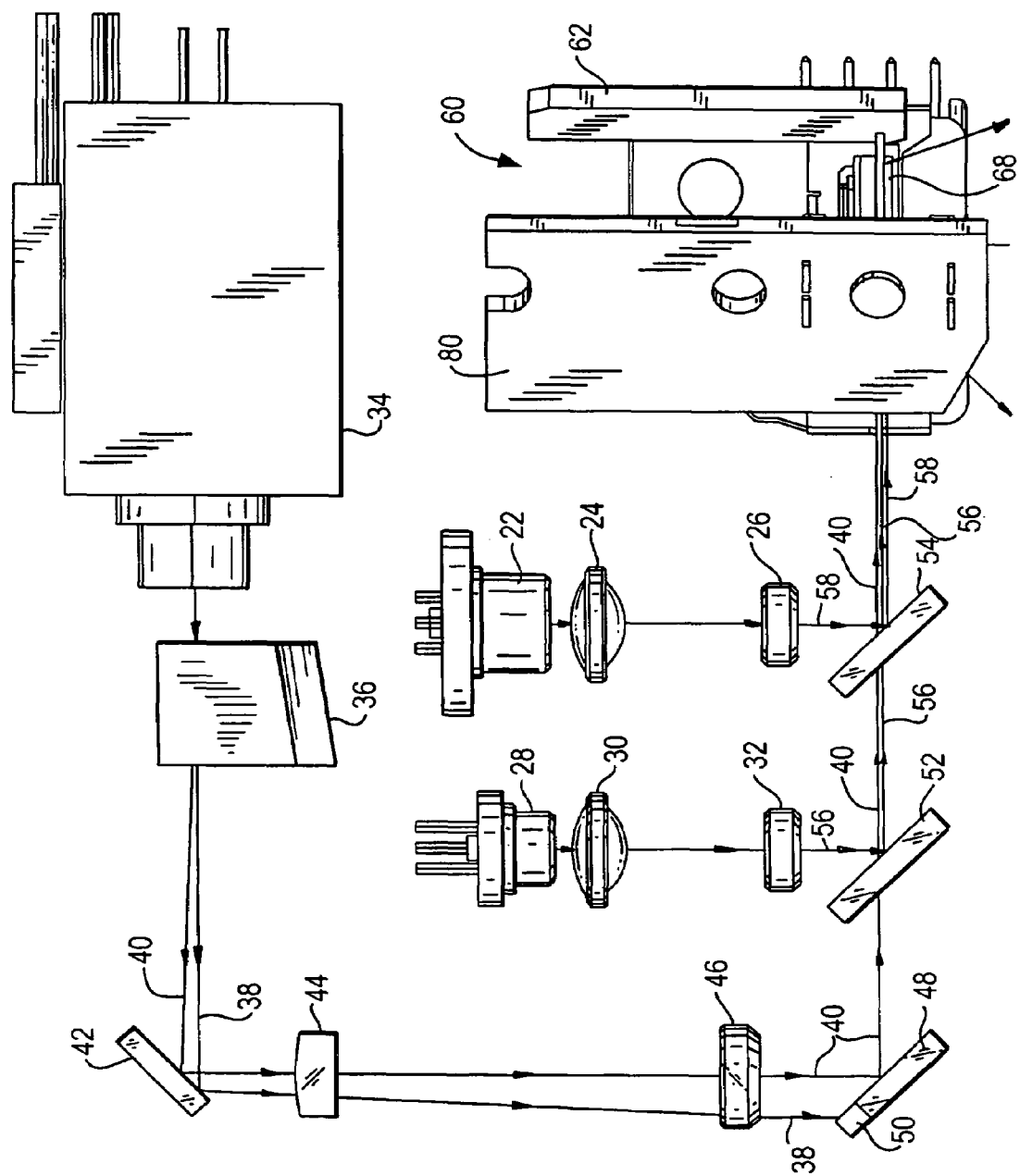

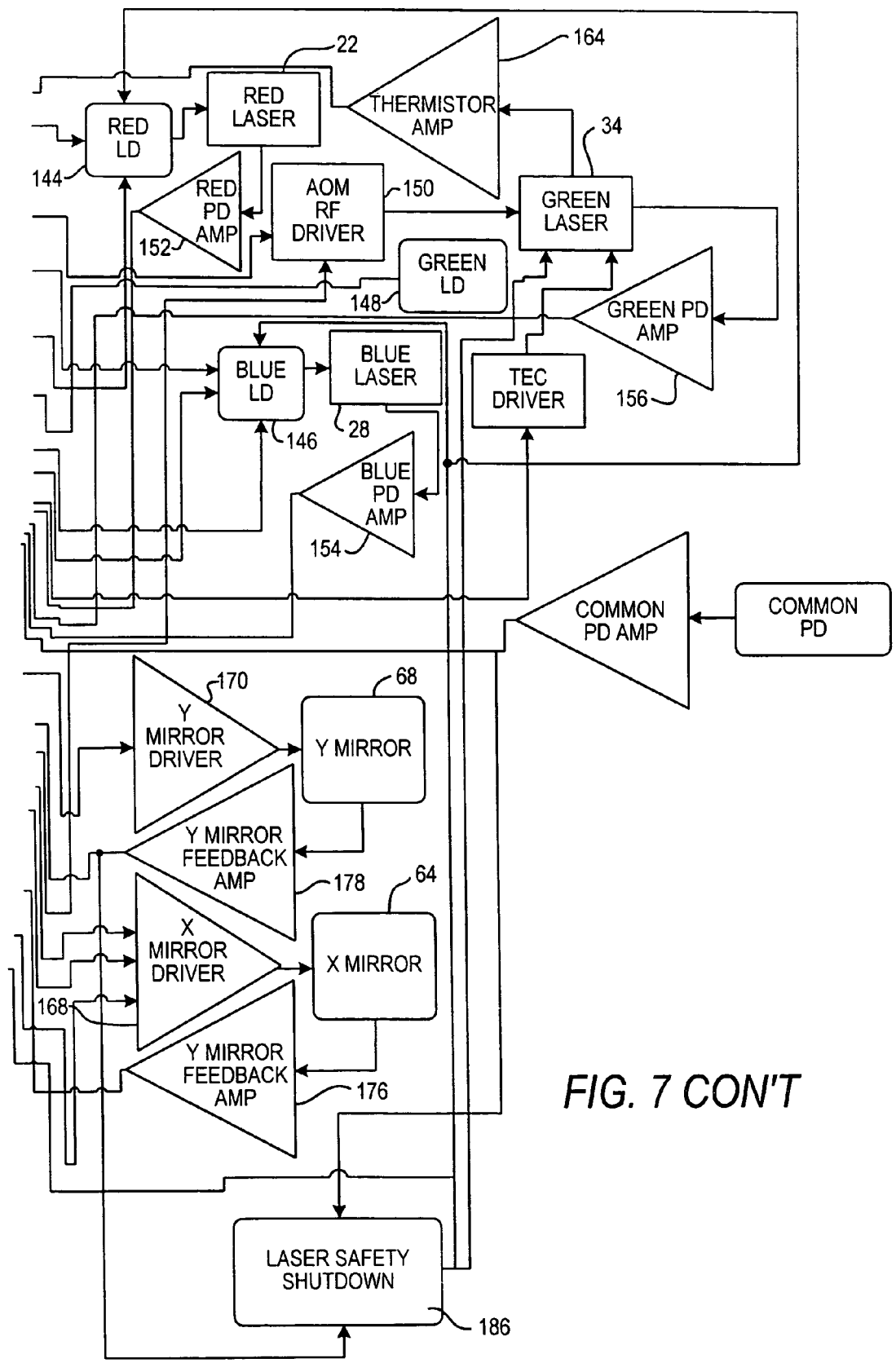
FIG. 7 CON'T

COLOR IMAGE PROJECTION ARRANGEMENT AND METHOD

CROSS REFERENCE TO RELATED APPLICATION

This application claims priority to U.S. Provisional Patent Application Ser. No. 60/633,951, filed Dec. 7, 2004.

BACKGROUND OF THE INVENTION

1. Field of the Invention

The present invention generally relates to projecting a two-dimensional image in color while maintaining low power consumption, high resolution, miniature compact size, quiet operation and minimal vibration.

2. Description of the Related Art

It is generally known to project a two-dimensional image on a screen based on a pair of scan mirrors which oscillate in mutually orthogonal directions to scan a laser beam over a raster pattern. However, the known image projection systems project the image with limited resolution, typically less than a fourth of video-graphics-array (VGA) quality of 640×480 pixels, and not in true color. The physical size and power consumption of the known projection systems are relatively high, thereby rendering them impractical for use in miniature, hand-held, battery-operated applications. Also, the low scan rates of the scan mirrors generate objectionable noise and vibration during use.

SUMMARY OF THE INVENTION

Objects of the Invention

Accordingly, it is a general object of this invention to provide an image projection arrangement that projects a sharp and clear, two-dimensional color image over an extended range of distances away from the arrangement.

Another object of this invention is to minimize power consumption in such projection arrangements.

Still another object of this invention is to increase the resolution of the color image projected by such arrangements.

Yet another object of this invention is to reduce, if not eliminate, objectionable noise and vibration during operation.

An additional object is to provide a miniature, compact, lightweight, and portable color image projection arrangement useful in many instruments of different form factors.

FEATURES OF THE INVENTION

In keeping with these objects and others which will become apparent hereinafter, one feature of this invention resides, briefly stated, in an image projection arrangement for projecting a two-dimensional, color image. The arrangement includes a support; a plurality of red, blue and green lasers for respectively emitting red, blue and green laser beams; a scanner for sweeping a pattern of scan lines in space at a working distance from the support, each scan line having a number of pixels; and a controller for causing selected pixels to be illuminated, and rendered visible, by the laser beams to produce the color image.

In accordance with one aspect of this invention, an optical assembly is provided on the support between the lasers and the scanner, for optically focusing and co-linearly arranging the laser beams to form a composite beam directed to the scanner.

In the preferred embodiment, the scanner includes a pair of oscillatable scan mirrors for sweeping the composite beam along generally mutually orthogonal directions at different scan rates and at different scan angles. At least one of the scan rates exceeds audible frequencies, for example, over 18 kHz, to reduce noise. At least one of the scan mirrors is driven by an inertial drive to minimize power consumption. The image resolution preferably exceeds one-fourth of VGA quality, but typically equals or exceeds VGA quality. The support, lasers, scanner, controller and optical assembly preferably occupy a volume of less than thirty cubic centimeters.

The arrangement is interchangeably mountable in housings of different form factors, including, but not limited to, a pen-shaped, gun-shaped or flashlight-shaped instrument, a personal digital assistant, a pendant, a watch, a computer, and, in short, any shape due to its compact and miniature size. The projected image can be used for advertising or signage purposes, or for a television or computer monitor screen, and, in short, for any purpose desiring something to be displayed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement in accordance with this invention for installation in the instrument of FIG. 1;

FIG. 3 is a top plan view of the arrangement of FIG. 2;

DETAILED DESCRIPTION OF THE PREFERRED EMBODIMENTS

Figure 4:
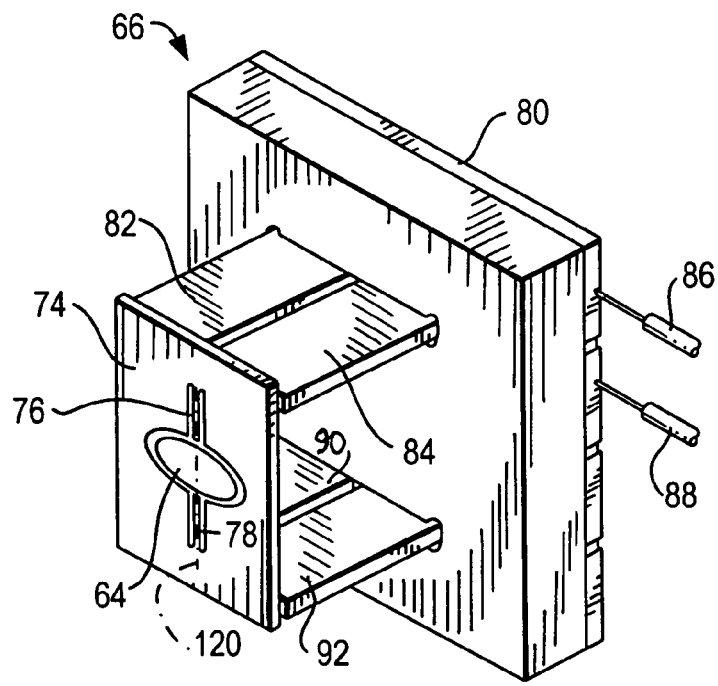
FIG. 4 is a perspective front view of an inertial drive for use in the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image at a variable distance from the instrument. By way of example, an image 18 is situated within a working range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped as a pen, a cellular telephone, a clamshell or a wristwatch, as, for example, shown in U.S. patent application Ser. No. 10/090,653, filed Mar. 4, 2002, assigned to the same assignee as the instant application, and incorporated herein by reference thereto.

In the preferred embodiment, the arrangement 20 measures less than about 30 cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a solid-state, preferably a semiconductor laser 22 which, when energized, emits a bright red laser beam at about 635-655 nanometers. Lens 24 is a biaspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another solid-state, semiconductor laser 28 is mounted on the support and, when energized, emits a diffraction-limited blue laser beam at about 475-505 nanometers. Another biaspheric convex lens 30 and a concave lens 32 are employed to shape the blue beam profile in a manner analogous to lenses 24, 26.

A green laser beam having a wavelength on the order of 530 nanometers is generated not by a semiconductor laser, but instead by a green module 34 having an infrared diode-pumped YAG crystal laser whose output beam is 1060 nanometers. A non-linear frequency doubling crystal is included in the infrared laser cavity between two laser mirrors. Since the infrared laser power inside the cavity is much larger than the power coupled outside the cavity, the frequency doubler is more efficient generating the double frequency green light inside the cavity. The output mirror of the laser is reflective to the 1060 nm infrared radiation, and transmissive to the doubled 530 nm green laser beam. Since the correct operation of the solid-state laser and frequency doubler require precise temperature control, a semiconductor device relying on the Peltier effect is used to control the temperature of the green laser module. The thermo-electric controller can either heat or cool the device depending on the polarity of the applied current. A thermistor is part of the green laser module in order to monitor its temperature. The readout from the thermistor is fed to the controller, which adjusts the control current to the thermo-electric controller accordingly.

As explained below, the lasers are pulsed in operation at frequencies on the order of 100 MHz. The red and blue semiconductor lasers 22, 28 can be pulsed at such high frequencies, but the currently available green solid-state lasers cannot. As a result, the green laser beam exiting the green module 34 is pulsed with an acousto-optical modulator 36 which creates an acoustic standing wave inside a crystal for diffracting the green beam. The modulator 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, an electro-optic modulator can be used either externally or internally to the green laser module to pulse the green laser beam. Other possible ways to modulate the green laser beam include electro-absorption modulation, or a Mach-Zender interferometer.

The beams 38, 40 are routed through positive and negative lenses 44, 46. However, only the diffracted green beam 40 is allowed to impinge upon, and reflect from, the folding mirror 48. The non-diffracted beam 38 is absorbed by an absorber 50, preferably mounted on the mirror 48.

The arrangement includes a pair of dichroic filters 52, 54 arranged to make the green, blue and red beams as co-linear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 5:
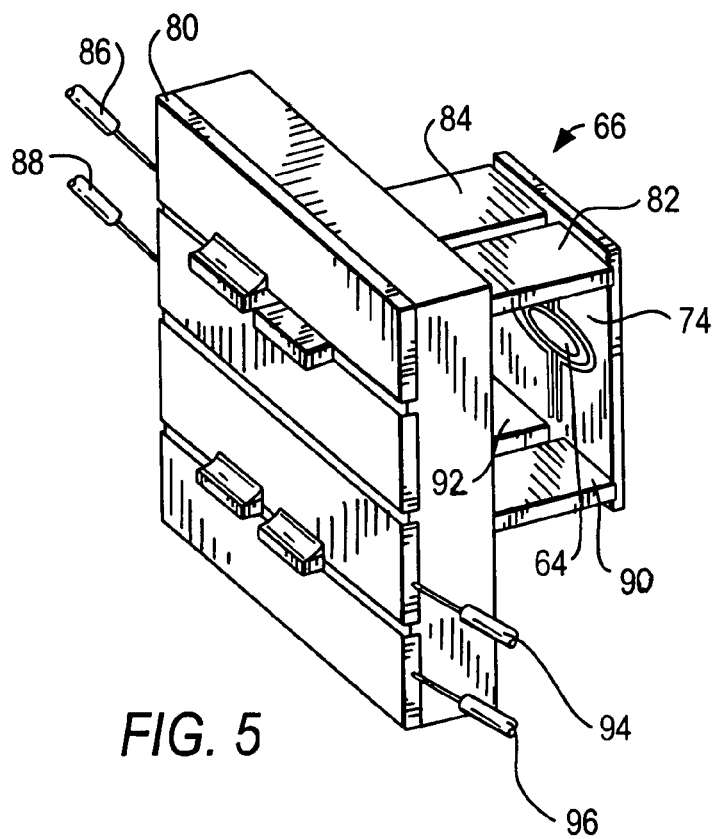
FIG. 5 is a perspective rear view of the inertial drive of FIG. 4.

The nearly co-linear beams 40, 56, 58 are directed to, and reflected off, a stationary bounce mirror 62. The scanning assembly 60 includes a first scan mirror 64 oscillatable by an inertial drive 66 (shown in isolation in FIGS. 4-5) at a first scan rate to sweep the laser beams reflected off the bounce mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto. The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of co-linear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of a one-piece, generally planar, silicon substrate which is approximately 150μ thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749μ×1600μ. Each hinge portion measure 27μ in width and 1130μ in length. The frame has a rectangular shape measuring 3100μ in width and 4600μ in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150μ thick, and the scan mirror has a high Q factor. A movement on the order of 1μ by each transducer can cause oscillation of the scan mirror at scan rates in excess of 20 kHz.

Another pair of piezoelectric transducers 90,92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Alternately, instead of using piezo-electric transducers 90, 92 for feedback, magnetic feedback can be used, where a magnet is mounted on the back of the high-speed mirror, and an external coil is used to pickup the changing magnetic field generated by the oscillating magnet.

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a horizontal scan line, and the slower mirror 68 sweeps the horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard, denoted 720 p, 1270×720 pixels, can be displayed. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slower mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
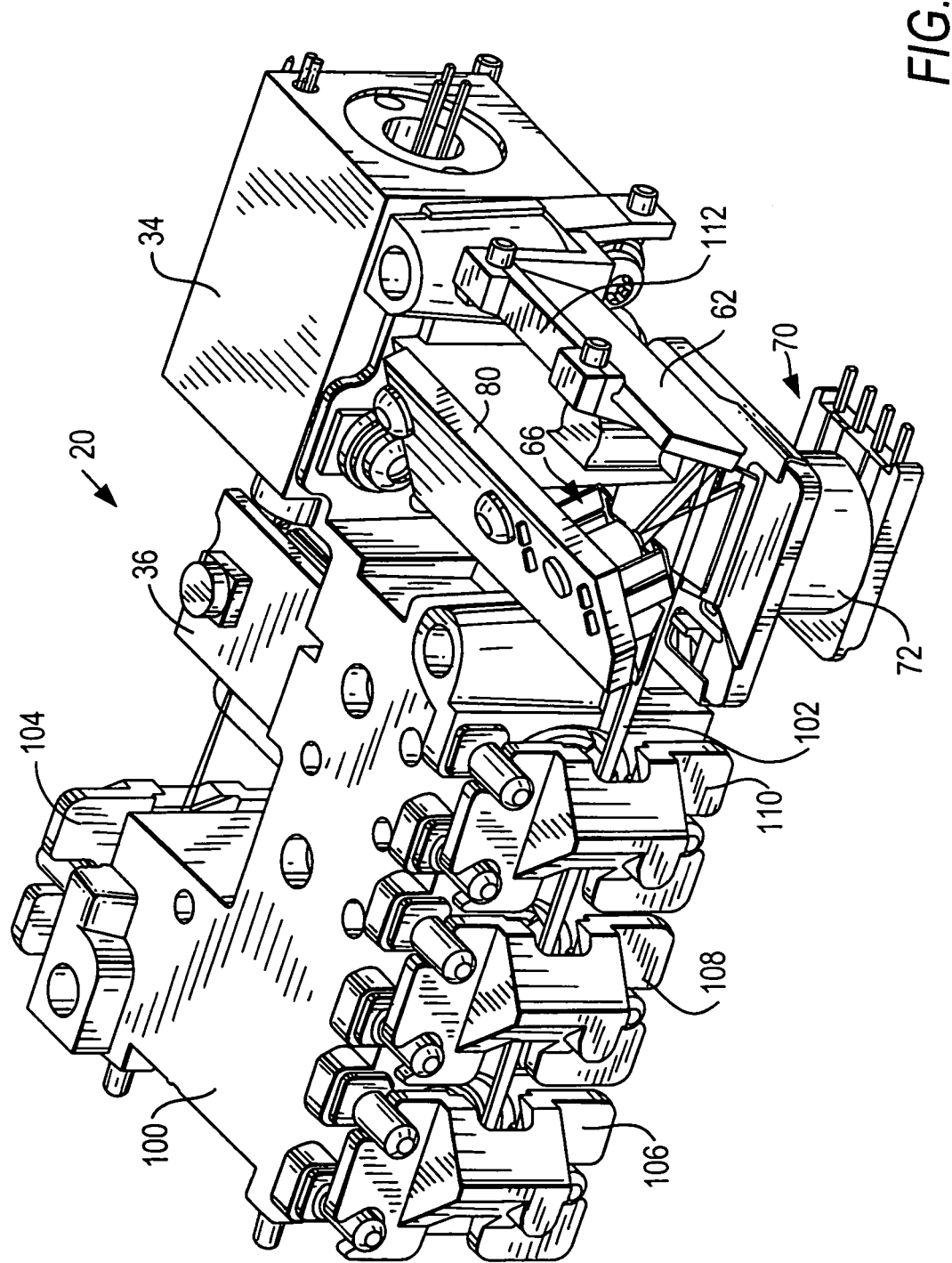
FIG. 6 is a perspective view of a practical implementation of the arrangement of FIG. 2.

FIG. 6 is a practical implementation of the arrangement 20 in the same perspective as that of FIG. 2. The aforementioned components are mounted on a support which includes a top cover 100 and a support plate 102. Holders 104, 106, 108, 110, 112 respectively hold folding mirrors 42, 48, filters 52, 54 and bounce mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprise the image, which can be any display of human- or machine-readable information or graphic.

Referring to FIG. 1, the raster pattern is shown in an enlarged view. Starting at an end point, the laser beams are swept by the inertial drive along the horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
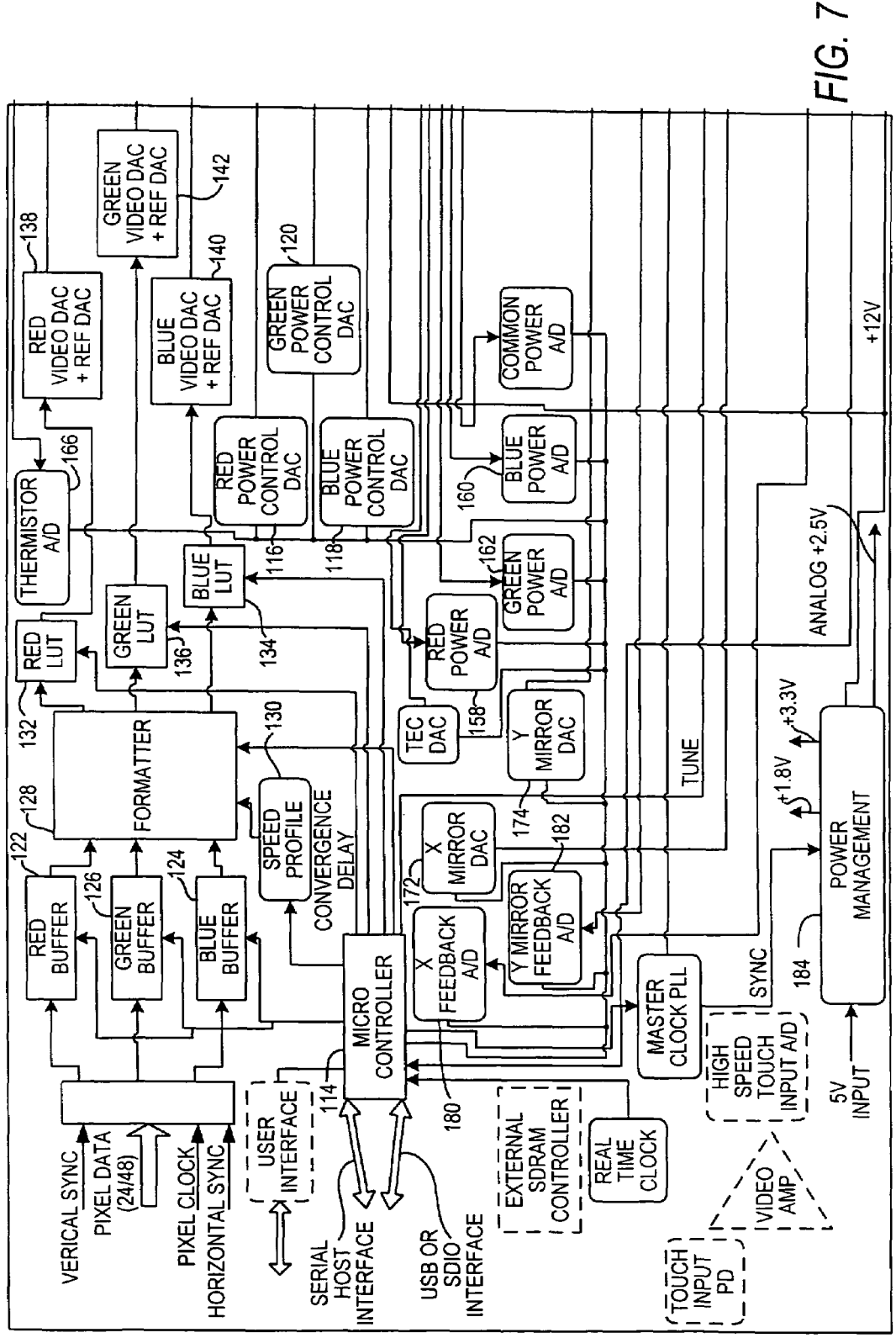
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being out of position.

It will be understood that each of the elements described above, or two or more together, also may find a useful application in other types of constructions differing from the types described above.

While the invention has been illustrated and described as embodied in a color image projection arrangement and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An image projection arrangement for projecting a two-dimensional, color image, comprising:
    a) a support;
    b) a laser assembly on the support, for emitting a plurality of laser beams of different wavelengths;
    c) a scanner on the support, for sweeping a pattern of scan lines in space at a working distance from the support, each scan line having a number of pixels;
    d) a controller operatively connected to the laser assembly and the scanner, for causing selected pixels to be illuminated, and rendered visible, by the laser beams to produce the image; and
    e) an optical assembly on the support between the laser assembly and the scanner, for focusing and substantially co-linearly arranging the laser beams to form a composite beam which is directed to the scanner, the optical assembly including a plurality of optical elements, one for directing each laser beam, and a corresponding plurality of holders, one for holding each optical element, for adjustably two-dimensional positioning of the respective optical element on the support for directing the respective laser beam into the co-linear arrangement of the composite beam.

2. The image projection arrangement of claim 1, wherein the laser assembly includes red and blue, solid-state, semiconductor lasers for respectively generating red and blue laser beams.

3. The image projection arrangement of claim 1, wherein the laser assembly includes a diode-pumped YAG laser and optical frequency doubler for producing a green laser beam.

4. The image projection arrangement of claim 1, wherein the scanner includes a first oscillatable scan mirror for sweeping the composite beam along a first direction at a first scan rate and over a first scan angle, and a second oscillatable scan mirror for sweeping the composite beam along a second direction substantially perpendicular to the first direction, and at a second scan rate different from the first scan rate, and at a second scan angle different from the first scan angle.

5. The image projection arrangement of claim 4, wherein at least one of the scan rates exceeds audible frequencies to minimize noise.

6. The image projection arrangement of claim 4, wherein at least one of the scan mirrors is oscillated by an inertial drive.

7. The image projection arrangement of claim 1, wherein the controller includes means for energizing the laser assembly to illuminate the selected pixels, and for deenergizing the laser assembly to non-illuminate pixels other than the selected pixels.

8. The image projection arrangement of claim 1, wherein the laser assembly includes red, blue and green lasers for respectively generating red, blue and green beams.

9. The image projection arrangement of claim 8, wherein the optical assembly includes a lens assembly for shaping each beam.

10. The image projection arrangement of claim 8, wherein the laser assembly includes an acousto-optical modulator for modulating the green beam to produce a non-diffracted beam and a diffracted beam.

11. The image projection arrangement of claim 10, wherein the laser assembly includes means for preventing the non-diffracted beam from being present in the composite beam.

12. The image projection arrangement of claim 8, wherein the optical assembly includes dichroic filters, each operative for reflecting at least one of the beams and for transmitting at least one of the beams.

13. The image projection arrangement of claim 1, wherein the controller is operative for effectively aligning the laser beams co-linearly by delaying the turning on and off of the pixels of the beams relative to each other.

14. An image projection arrangement for projecting a two-dimensional, color image, comprising:
    a) a support;
    b) a laser assembly including red, blue and green lasers for respectively emitting a plurality of red, blue and green laser beams;

c) an optical assembly on the support, for optically focusing and co-linearly arranging the laser beams to form a composite beam at a working distance from the support, the optical assembly including a plurality of optical elements, one for directing each laser beam, and a corresponding plurality of holders, one for holding each optical element, for adjustably two-dimensional positioning of the respective optical element on the support for directing the respective laser beam into the co-linear arrangement of the composite beam;

d) a scanner on the support, for sweeping the composite beam in a pattern of scan lines in space at said distance from the module, each scan line having a number of pixels; and e) a controller operatively connected to the scanner, for causing selected pixels to be illuminated, and rendered visible, by the composite beam to produce the image, the controller being operative for selecting at least some of the laser beams to illuminate the selected pixels to produce the image with color.

15. The image projection arrangement of claim 14, wherein the optical elements include a first dichroic filter for reflecting the blue beam and for transmitting the green beam therethrough, and a second dichroic filter optically aligned with the first dichroic filter for reflecting the red beam and for transmitting the blue and green beams therethrough, and a mirror optically aligned with the dichroic filters for reflecting the green beam towards the dichroic filters.

16. The image projection arrangement of claim 14, wherein the support includes a plurality of positioning posts, and wherein each holder has a plurality of positioning slots for receiving the posts.

17. A method of projecting a two-dimensional, color image at a variable distance, comprising the steps of:

a) emitting a plurality of laser beams of different wavelengths;

b) sweeping a pattern of scan lines in space, each scan line having a number of pixels;

c) causing selected pixels to be illuminated, and rendered visible, by the laser beams to produce the image; and d) co-linearly arranging the laser beams to form a composite beam used to sweep the scan lines, by providing a plurality of optical elements, one for directing each laser beam, and by providing a corresponding plurality of holders, one for holding each optical element, and by adjustably two-dimensional positioning of the respective optical element for directing the respective laser beam into the co-linear arrangement of the composite beam.

18. An image projection arrangement for projecting a two-dimensional, color image, comprising:

a) a support;

b) a laser assembly supported by the support, for emitting a plurality of laser beams of different wavelengths;

c) an optical assembly supported by the support, for focusing and substantially co-linearly arranging the laser beams to form a composite beam, the optical assembly including a plurality of optical elements, one for directing each laser beam, and a corresponding plurality of holders, one for holding each optical element, for adjustably two-dimensional positioning the respective optical element on the support for directing the respective laser beam into the co-linear arrangement of the composite beam; and d) a scanner supported by the support, for sweeping the composite beam as a pattern of scan lines at a working distance from the support.

19. The image projection arrangement of claim 18, wherein each holder has a pair of inclined slots converging toward, but terminating short of, each other, and a linear slot extending along a line between the inclined slots; and wherein the support includes a plurality of positioning posts, one received in each slot, for two-dimensional positioning of the respective holder and the respective optical element held thereon.

* * * * *